(12) United States Patent
Jeffcoat, III et al.

(10) Patent No.: US 12,703,032 B2
(45) Date of Patent: Aug. 11, 2026

(54) GRATING SEPARATION METHOD AND SYSTEM FOR SEPARATING GRATING

(71) Applicant: NUCOR CORPORATION, Charlotte, NC (US)

(72) Inventors: Asa O. Jeffcoat, III, Palestine, TX (US); James Royce Pate, Grapeland, TX (US); Curtis Lee Waits, Grapeland, TX (US)

(73) Assignee: NUCOR CORPORATION, Charlotte, NC (US)

( * ) Notice: Subject to any disclaimer, the term of this patent is extended or adjusted under 35 U.S.C. 154(b) by 633 days.

(21) Appl. No.: 17/971,855

(22) Filed: Oct. 24, 2022

(65) Prior Publication Data

US 2023/0136290 A1 May 4, 2023

Related U.S. Application Data

(60) Provisional application No. 63/273,460, filed on Oct. 29, 2021.

(51) Int. Cl.
*B23D 19/06* (2006.01)
*B23D 1/14* (2006.01)
(Continued)

(52) U.S. Cl.
CPC ............... *B23D 19/06* (2013.01); *B23D 1/14* (2013.01); *B23P 13/04* (2013.01); *B26D 1/24* (2013.01); *E04C 2/421* (2013.01)

(58) Field of Classification Search
CPC ....... Y10T 83/7809; E04C 2/421; E04C 2/42; B23P 13/04; B23D 19/00; B23D 19/04;
(Continued)

(56) References Cited

U.S. PATENT DOCUMENTS 2,573,332 A * 10/1951 Herman ............... B23D 35/007 56/249.5
2,679,900 A * 6/1954 Bottenhorn ............ B23D 19/06 83/505
(Continued)

FOREIGN PATENT DOCUMENTS

CN 206500669 U * 9/2017

*Primary Examiner* — Phong H Nguyen
(74) *Attorney, Agent, or Firm* — Moore & Van Allen PLLC; Jeffrey R. Gray

(57) ABSTRACT

Grating is formed from longitudinal members and transverse members that are operatively coupled together. The longitudinal members may be described as bearing members and the transverse members may be described as cross members that extend between the bearing members. The separation system and process of the present disclosure separates an initial grating having an initial grating width into multiple gratings have gratings widths less than the initial grating width. The separation system includes a driven die assembly having opposing dies, each opposing die having knives and spacers which interact to separate the cross members of the grating to create multiple gratings as the same time. The knives may be set up in different configurations in order to create any number of gratings having flush cross members (e.g., flush with the bearing members) and/or overhanging cross members (e.g., hang over the bearing members).

17 Claims, 13 Drawing Sheets

(51) Int. Cl.
*B23P 13/04* (2006.01)
*B26D 1/24* (2006.01)
*E04C 2/42* (2006.01)

(58) Field of Classification Search
CPC . B23D 19/06; B26D 1/01; B26D 1/12; B26D 1/14; B26D 1/143; B26D 1/22; B26D 1/24
See application file for complete search history.

(56) References Cited

U.S. PATENT DOCUMENTS 3,411,392 A * 11/1968 Spangler .............. B23D 35/008 83/498
4,245,534 A * 1/1981 Van Cleave ........... B23D 19/04 83/859
4,959,986 A * 10/1990 Kranis, Sr. ............. B23D 19/06 72/204

* cited by examiner

GRATING SEPARATION METHOD AND SYSTEM FOR SEPARATING GRATING

CROSS REFERENCE AND PRIORITY CLAIM UNDER 35 U.S.C. § 119

The present Application for a Patent claims priority to U.S. Provisional Patent Application Ser. No. 63/273,460 entitled "Grating Separation Method and System for Separating Grating," filed on Oct. 29, 2021, both of which are assigned to the assignees hereof and hereby expressly incorporated by reference herein.

FIELD

This application relates generally to the field of grating systems and methods, and more particularly, to improvements in grating separation methods and systems.

BACKGROUND

Grating may be used for many different purposes, such as but not limited to stairs, factory flooring, drainage coverings, walkways, platforms for walking or parking, security applications, fencing, shelving, safety guards, transportation supports, or the like. Grating with apertures allow for material (e.g., solids, liquids, or the like, or combinations thereof) to pass through the grating, provide structural support at reduced weights and costs, and/or provide other benefits. It may be formed into a lattice pattern (e.g., overlapping, intersecting, or the like) and formed from steel, aluminum, or other materials. Grating is typically formed to standard or custom sizes and/or cut manually in order to achieve the desired widths of the grating.

BRIEF SUMMARY

Grating is formed from longitudinal members and transverse members that are operatively coupled together, such as through welding, press-locking, swage-locking (e.g., for aluminum grating), or formed through other like connections. The grating may be formed of any material, but in particular the grating may be formed of steel or aluminum. It should be understood that the longitudinal members and the transverse members may be the same types of members or different types of members. In particular embodiments, the longitudinal members may be described as bearing members and the transverse members may be described as cross members. However, it should be understood that the longitudinal members may be the cross members, and the transverse members may be bearing members. In some embodiments, the bearing members may be bearing bars, such a bearing bars formed from sheet steel that has been split into strips. In some embodiments, the cross members may be cross-bars made of rods (e.g., of any shape). The cross members may be welded to the bearing bars. However, it should be understood that the bearing members and the cross members may have any shape and may be operatively coupled together in any configuration using any connection (e.g., welds, fasteners, interference fit, or the like). The grating members, such as the bearing members and/or the cross members, may be smooth or may be serrated (e.g., for improving grip for walking or for storing products) depending on the application for the grating.

The grating, such as the initial grating formed having an initial grating width, as well as the one the or more grating sections created from the initial grating (e.g., having grating widths that are less than the initial grating width), have an upper surface, a lower surface, two edges (e.g., first and second edges), and two ends (e.g., first and second ends). The separation system (otherwise described as a separation machine, or the like) may comprise one or more drives (e.g., motor, or the like), one or more shafts operatively coupled to the one or more drives (e.g., a proximal shaft and a distal shaft for each die), and a die assembly operatively coupled to the one or more shafts. The die assembly may comprise opposing dies, such as a proximal die and a distal die, opposing knives, such as proximal knives and distal knives, and one or more spacers. The knives and spacers may be set up on the proximal dies and the distal dies in order to guide the initial grating through the die assembly and/or to separate the initial grating into one or more grating sections having grating widths less than the initial grating width. The knives may be set up in different configurations in order to create any number of gratings having flush cross members (e.g., flush with the bearing members) and/or overhanging cross members (e.g., hang over the bearing members), as will be described herein.

An embodiment of the present disclosure comprises a method of separating grating. The method comprises passing an initial grating through a proximal die with one or more proximal knives and a distal die with one or more distal knives, wherein the initial grating has an initial grating width. The method further comprises forming one or more gratings from the initial grating by the one or more proximal knives and the one or more distal knives. The one or more gratings have grating widths that are less than the initial grating width. The initial grating and the one or more gratings each comprise a plurality of bearing members and a plurality of cross members that extend across the plurality of bearing members. The initial grating is separated into the one or more gratings by the one or more proximal knives of the proximal die and the one or more distal knives of the distal die that separate at least a portion of the plurality of cross members from each other.

In further accord with embodiments, the method further comprises identifying a number of gratings, one or more widths of the gratings, overhanging cross members, or flush cross members, and selecting the one or more proximal knives and the one or more distal knives to form the one or more gratings having the one or more widths, the overhanging cross members, or the flush cross members.

In other embodiments, the method further comprises assembling the one or more proximal knives to the proximal die, assembling the one or more distal knives to the distal die, and assembling one or more spacers to the proximal die and one or more spacers to the distal die.

In still other embodiments, when forming a grating having overhanging cross members, the one or more proximal knives comprise a first proximal knife on the proximal die, and the one or more distal knives comprise a first distal knife on the distal die adjacent to and opposing the first proximal knife.

In yet other embodiments, when forming a grating having overhanging cross members, the one or more proximal knives comprise a first proximal knife on the proximal die, and the one or more distal knives comprise a first distal knife on the distal die adjacent to and opposing the first proximal knife, and an offset spacer, and wherein a first distal knife width and an offset spacer width fit within adjacent bearing members.

In other embodiments, when forming a grating having flush cross members the one or more proximal knives comprise a first proximal knife adjacent to a second proximal knife on the proximal die, and the one or more distal knives comprise a first distal knife on the distal die aligned between and opposed to the first proximal knife and the second proximal knife on the proximal die.

In further accord with embodiments, the proximal die interacts with an upper surface of the initial grating and the one or more gratings.

In other embodiments, the distal die interacts with a lower surface of the initial grating and the one or more gratings.

In still other embodiments, the one or more distal knives have a distal knife width to extend between two adjacent bearing members of the plurality of bearing members where adjacent cross members are separated.

In yet other embodiments, the one or more distal knives are used without the one or more proximal knives to serve as a guide to aid in passing the initial grating between the proximal die and distal die without separating the initial grating where the guide is located.

Another embodiment of the present disclosure comprises a die assembly for separating an initial grating into one or more gratings. The die assembly comprises a proximal die having one or more proximal knives, and a distal die having one or more distal knives. The one or more distal knives are located adjacent and opposite of the one or more proximal knives and are configured to separate the initial grating into the one or more gratings. The initial grating and the one or more gratings each comprise a plurality of bearing members and a plurality of cross members that extend across the plurality of bearing members, and wherein the one or more gratings have one or more grating widths that are less than an initial grating width of the initial gratin. The one or more proximal knives of the proximal die and the one or more distal knives of the distal die separate the initial grating into the one or more gratings by separating at least a portion of the plurality of cross members from each other.

In further accord with embodiments, when forming a grating having overhanging cross members, the one or more proximal knives comprise a first proximal knife on the proximal die, and the one or more distal knives comprise a first distal knife on the distal die adjacent to and opposing the first proximal knife.

In other embodiments, when forming a grating having overhanging cross members, the one or more proximal knives comprise a first proximal knife on the proximal die, and the one or more distal knives comprise a first distal knife on the distal die adjacent to and opposing the first proximal knife, and an offset spacer, and wherein a first distal knife width and an offset spacer width fit within adjacent bearing members.

In yet other embodiments when forming a grating having flush cross members the one or more proximal knives comprise a first proximal knife adjacent to a second proximal knife on the proximal die, and the one or more distal knives comprise a first distal knife on the distal die aligned between and opposed to the first proximal knife and the second proximal knife on the proximal die.

In still other embodiments, the proximal die interacts with an upper surface of the initial grating and the one or more gratings, and the distal die interacts with a lower surface of the initial grating and the one or more gratings.

In other embodiments, the one or more distal knives have a distal knife width to extend between two adjacent bearing members of the plurality of bearing members where the cross members are separated.

In further accord with embodiments, the one or more distal knives are used without the one or more proximal knives to serve as a guide to aid in passing the initial grating between the proximal die and distal die without separating the initial grating where the guide is located.

Another embodiment of the present disclosure comprises a grating separating machine. The grating separating machine comprises a drive, one or more drive shafts operatively coupled to the drive, and a die assembly operatively coupled to the one or more drive shafts. The die assembly comprises a proximal die having one or more proximal knives, and a distal die having one or more distal knives. The one or more distal knives are located adjacent and opposite of the one or more proximal knives and are configured to separate an initial grating into one or more gratings. The initial grating and the one or more gratings each comprise a plurality of bearing members and a plurality of cross members that extend across the plurality of bearing members. The one or more gratings have one or more grating widths that are less than an initial grating width of the initial grating. The one or more proximal knives of the proximal die and the one or more distal knives of the distal die separate the initial grating into the one or more gratings by separating at least a portion of the plurality of cross members from each other.

In further accord with embodiments, when forming a grating having overhanging cross members the one or more proximal knives comprise a first proximal knife on the proximal die, and the one or more distal knives comprise a first distal knife on the distal die adjacent to and opposing the first proximal knife. Alternatively, when forming a grating having overhanging cross members the one or more proximal knives comprise the first proximal knife on the proximal die, and the one or more distal knives comprise the first distal knife on the distal die adjacent to and opposing the first proximal knife, and an offset spacer, and wherein a first distal knife width and an offset spacer width fit within adjacent bearing members.

In other embodiments, when forming a grating having flush cross members the one or more proximal knives comprise a first proximal knife adjacent to a second proximal knife on the proximal die, and the one or more distal knives comprise a first distal knife on the distal die aligned between and opposed to the first proximal knife and the second proximal knife on the proximal die.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The accompanying drawings illustrate some of the embodiments of the invention and are not necessarily drawn to scale, wherein.

DETAILED DESCRIPTION

Figure 1:
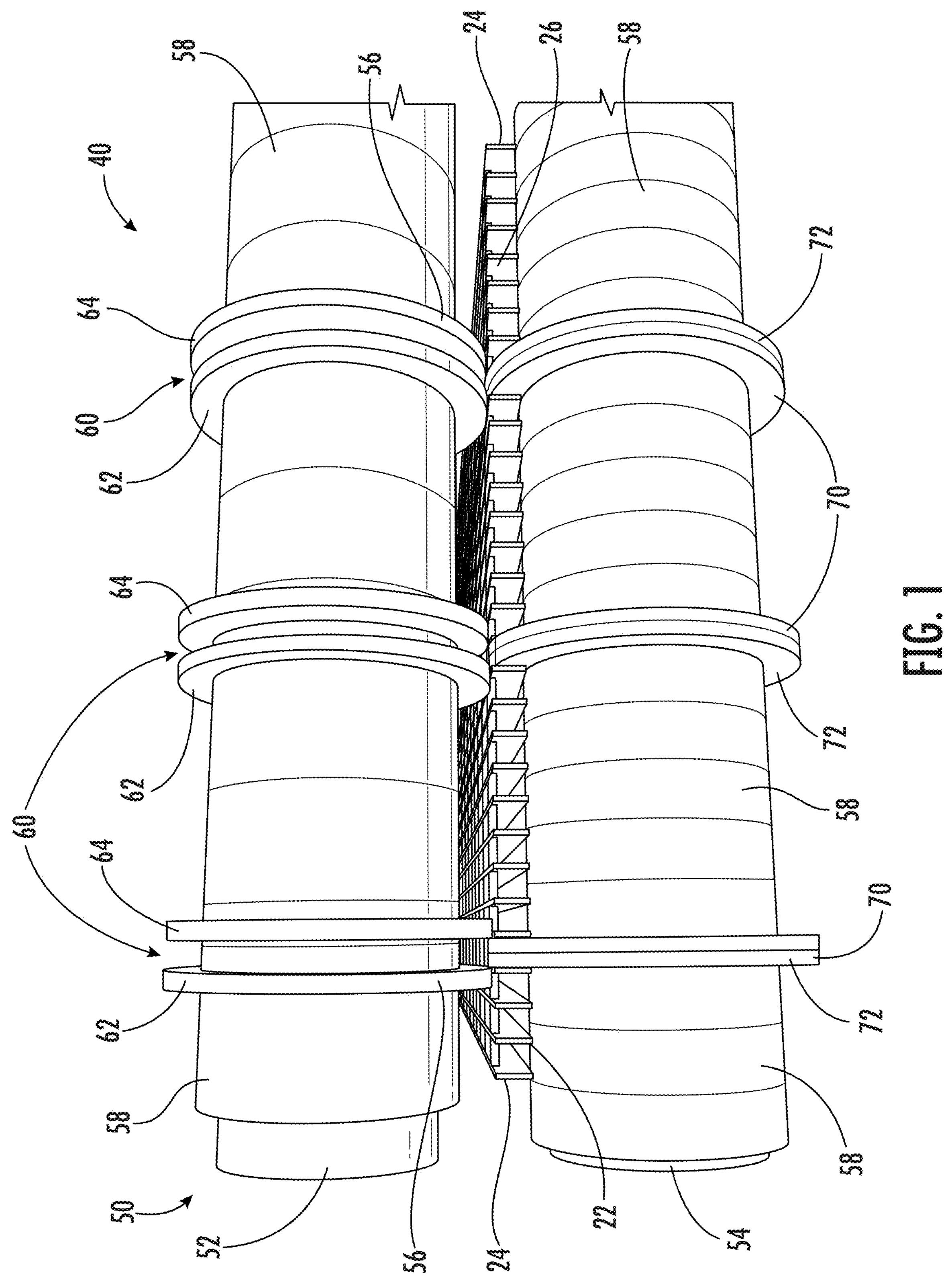
FIG. 1 illustrates a perspective view of a die assembly for separating an initial grating into multiple gratings with flush cross members, in accordance with some embodiments of the present invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Grating 1 (e.g., otherwise described as a grate) is formed from longitudinal members 10 and transverse members 14 that are operatively coupled together, such as through welding, press-locking, swage-locking (e.g., for aluminum grating), or formed through other like connections. The grating 1 may be formed of any material, but in particular embodiments, the grating 1 may be formed of steel or aluminum. It should be understood that the longitudinal members 10 and the transverse members 14 may be the same types of members or different types of members. In particular embodiments, the longitudinal members 10 may be described as bearing members 12 and the transverse members 14 may be described as cross members 16. However, it should be understood that the longitudinal members 10 may be the cross members 16, and the transverse members 14 may be bearing members 12. In some embodiments, the bearing members 12 may be bearing bars, such a bearing bars formed form sheet steel that has been split into strips (e.g., having a rectangular shape). In some embodiments, the cross members 16 may be cross-bars made of rods (e.g., of any shape, such as circular, oval, square, rectangular, helical, non-uniform, or the like cross-section, which are straight, twisted, or the like). The cross members 16 may be welded to the bearing bars or may be operatively coupled in other ways through the use of other connections. However, it should be understood that the bearing members 12 and the cross members 16 may have any shape (e.g., strips, rods, or the like) and may be operatively coupled together in any configuration using any connection (e.g., welds, fasteners, or the like). The grating members, such as the bearing members 12 and/or the cross members 16, may be smooth or may be serrated (e.g., for improving grip for walking or for storing products) depending on the application for the grating 1.

The grating 1, such as the initial grating 2 (e.g., otherwise described as an initial grate) formed before being separated into multiple grating sections 4 (e.g., otherwise described as a multiple grate sections 4, or multiple grates 4), and/or the separated grating sections 4, will have an upper surface 20, a lower surface 22, two edges 24 (e.g., first and second edges), and two ends (e.g., first and second ends) 26. The cross members 16 may be located adjacent the upper portion of the bearing members 12, and as such the cross members 16 and upper portion of the bearing members 12 form the upper surface of the grating 1. The upper surface of the bearing members 12 and the upper surface of the cross members 16 may be on the same plane or may be offset from each other (e.g., the upper surface of the cross members 16 may be above or below the upper surface of the bearing members 12). The lower portion of the bearing members 12 form the lower surface 22 of the grating 1. As will be described with respect to FIGS. 1 and 2, and 3 and 4, the two edges 24 of the grating 1 may have flush cross members 18 or overhanging cross members 19 (e.g., having different lengths), based on the set up of the knives 56 of the die assembly 40.

The separation system 30 (otherwise described as a separation machine) may comprise one or more drives (not shown) (e.g., a single motor, or multiple motors, such as a proximal motor, a distal motor or the like), one or more shafts 34 operatively coupled to the one or more drives (e.g., a proximal shaft and a distal shaft for each die), a transport system (e.g., rollers, conveyor, or the like), and a die assembly 40 operatively coupled to the one or more shafts. The die assembly 40 may comprise opposing dies 50, such as a proximal die 52 and a distal die 54, opposing knives 56, such as proximal dies 60 and distal knives 70, and one or more spacers 58 on both the proximal die 52 and distal die 54.

Figure 2:
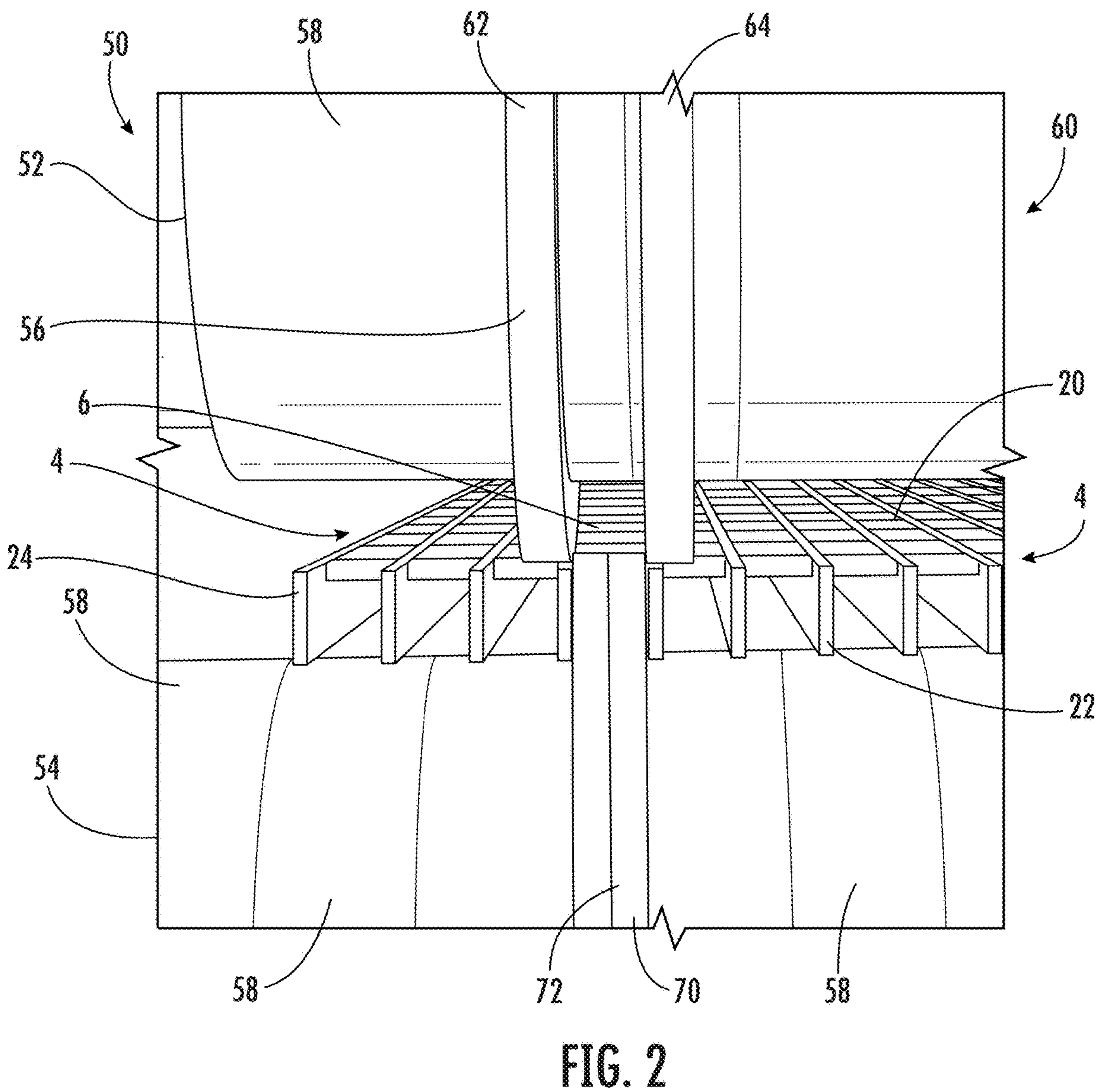
FIG. 2 illustrates an enlarged perspective view of a portion of the die assembly of FIG. 1, in accordance with embodiments of the present invention.

FIGS. 1 and 2 illustrate a knife set up in which the grating 1, such as an initial grating 2 is separated into one or more grating sections 4 having flush cross members 18. That is, the initial grating 2 is separated such that each of the gratings 4 formed at the separation locations 6 have flush cross members 18. The flush cross members 18 indicate that the cross members 16 are in line with the bearing member 12 at the edge 24 of the grating section 4 created (e.g., in line with the outer surface of the bearing member 12 at the edge 24).

It should be understood that the flush cross members 18 may extend slightly past the outer surface of the bearing member 12 or be set back from the outer surface of the bearing member 12 depending on the tolerance stacking of the grating, tolerance stacking of the die assembly 40, the knife sharpness, or other like factors. In order to create the grating sections 4 with the flush cross members 18, the one or more proximal knives 60 comprise a first proximal knife 62 adjacent to and spaced apart from a second proximal knife 64 on the proximal die 52 (e.g., spaced the same or similar distance as two adjacent bearing members 12 of the grating 1). The one or more distal knives 70 comprise a first distal knife 72 on the distal die 54 aligned between and opposed to the first proximal knife 62 and the second proximal knife 64 on the proximal die 52. In some embodiments, the one or more distal knives 70 may comprise a single first distal knife 72, or a first distal knife 72, second distal knife, third distal knife, and/or the like stacked together. Regardless of the configuration, one of the one or more distal knives 70 may fit within two adjacent bearing members 12 of the grating 1 and the spaced first proximal knife 62 and second proximal knife 64, and work in conjunction with the two or more proximal knives 60 (e.g., a first proximal knife 62 and second proximal knife 64) to separate the initial grating 2 into the one or more flush grating sections 4.

Figure 3:
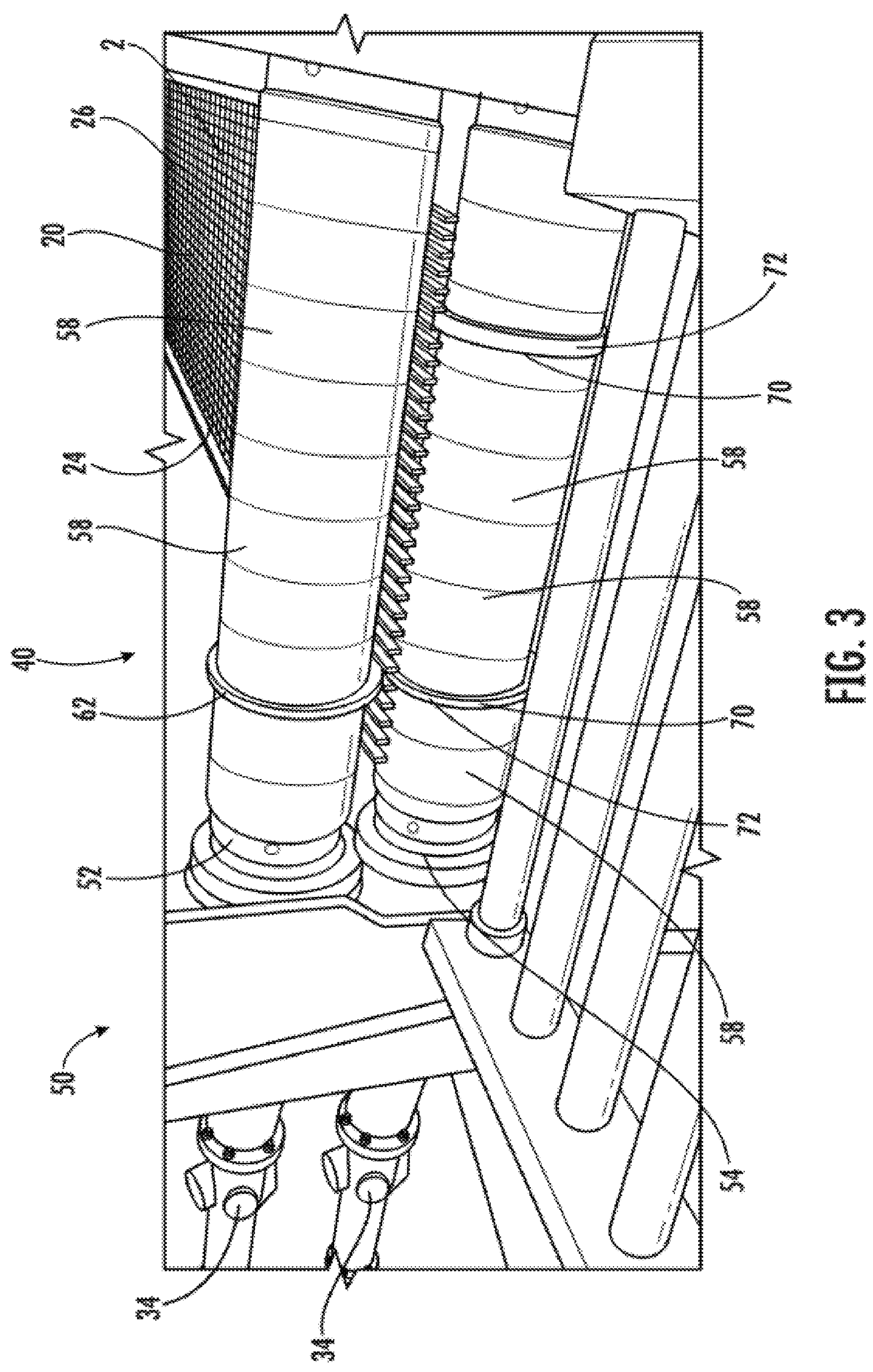
FIG. 3 illustrates a perspective view of a die assembly for separating an initial grating into smaller gratings with overhanging cross members, in accordance with some embodiments of the present invention.
Figure 4:
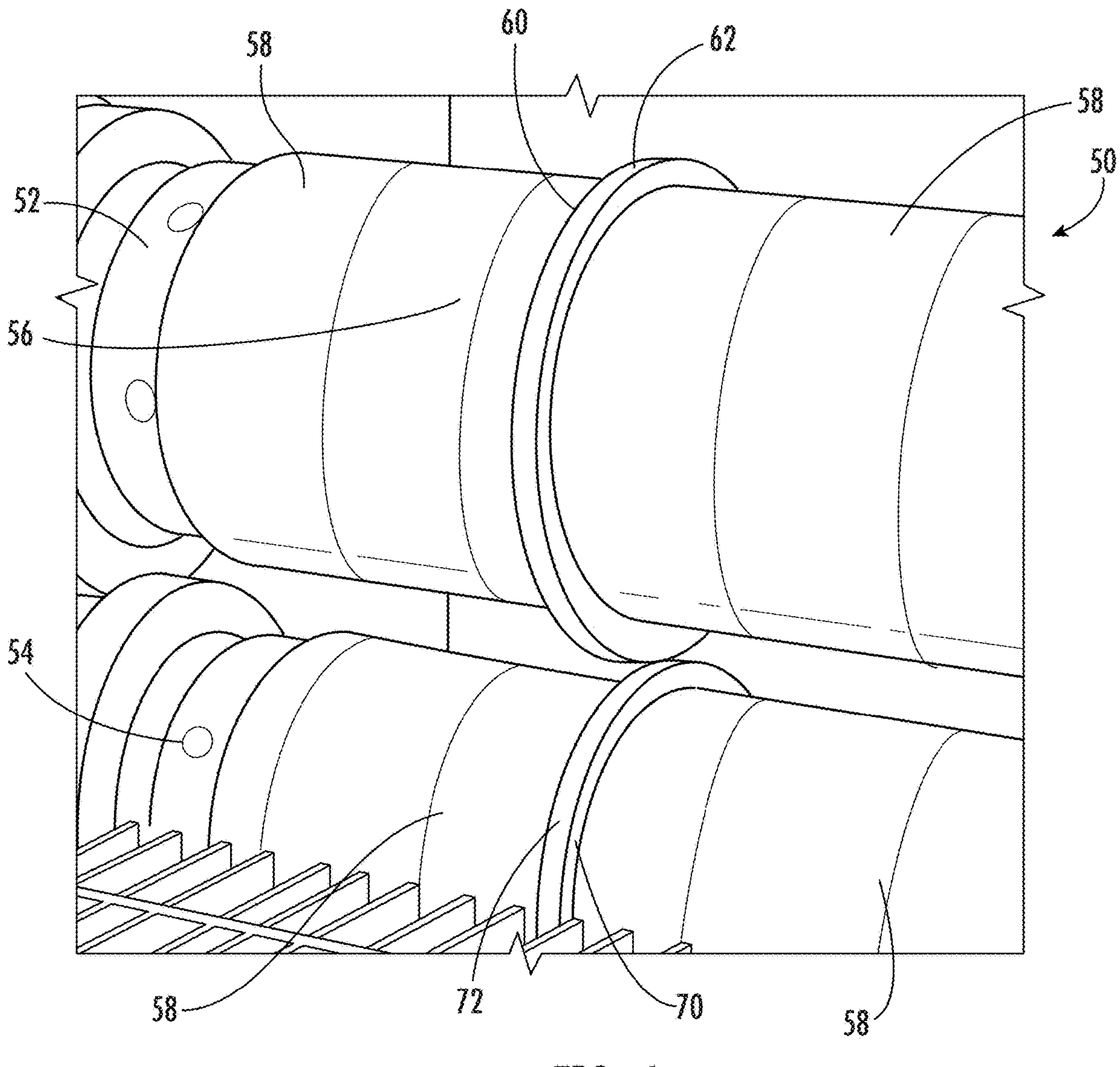
FIG. 4 illustrates an enlarged perspective view of a portion of the die assembly of FIG. 3, in accordance with some embodiments of the present invention.

FIGS. 3 and 4 illustrate a knife set up in which the grating 1, such as an initial grating 2 is separated into one or more grating sections 4 having overhanging cross members 19 (e.g., otherwise described as overhung cross members, or the like). That is, the initial grating 2 is separated such that at least one of the grating sections 4 at the separation location 6 has overhanging cross members 19. The overhanging cross members 19 indicate that the cross members 16 overhang the bearing member 12 at the edge 24 of the grating section 4 created. In the illustrated embodiments in FIGS. 3 and 4, the overhanging cross members 19 occur on one side of one of the grating sections 4, while the other adjacent grating section 4 created by the separation system 30 would have a flush cross members 18. In order to create the grating sections with the overhanging cross members 19, the one or more proximal knives 60 comprise a first proximal knife 62 on the proximal die 52. The one or more distal knives 70 comprise a first distal knife 72 on the distal die 54 aligned offset from the opposed first proximal knife 62 of the proximal die 52. The intersection between the first proximal knife 62 and the first distal knife 72 is set at the location where the cross members 16 intersect with the bearing members 12. In some embodiments, the first proximal knife 62 may be comprised of two or more proximal knives 62 stacked together, and the first distal knife 70 may be comprised of two or more distal knives 72 stacked together. Regardless of the configuration, one of the one or more distal knives 70 may fit within two adjacent bearing members 12 of the grating 1, and work in conjunction with one of the one or more proximal knives 60 to separate the initial grating 2 into the one or more overhanging grating sections 4.

In some embodiments, the overhanging cross members 19 may be created on both edges of adjacent gratings 4 being separated from each other. For example, by setting the intersecting edges of the opposing proximal knife 62 and distal knife 72 at the center of the cross member 16 between two adjacent bearing members 12, two adjacent grating sections 4 may be formed with both having overhanging cross members 19. In order to create adjacent grating sections 4 both having overhanging cross members 19, an edge of a proximal knife 60 maybe set for alignment at approximately the centerline of cross members 19 (or another location of on the cross members 19 between adjacent bearing members 12). Alternatively, a distal knife 70 and a knife offset (not illustrated) may be used to set the location of the distal knife 70 opposing and offset from the proximal knife 60. The knife offset width and the distal knife width may be sized to fit between two adjacent bearing members 12; however, the diameter of the knife offset is less than the distal knife 70. As such, the knife offset may be the same structure, or a different structure, as the distal knife 70 (e.g., cylindrical knife), but may have a smaller outer diameter. As such, the knife offset will have a diameter to fit between two adjacent bearing members 12 but will not have the diameter to interact with the cross members 16 and/or the proximal knife 60. In some embodiments the knife offset may be integral within the distal knife 70 (e.g., extending from the side of the distal knife 70). Regardless of the type of knife offset, in this configuration, the distal knife 70 that is opposing the proximal knife 60 at the centerline of the cross members 16 will interact to separate the initial grating 2 into two adjacent grating sections 4 at the centerline of the cross members 16 in order to form adjacent gratings both with overhanging cross members 19.

In some embodiments, two distal knives 70 may be separated by a knife offset in order to allow the two distal knives 70 and knife offset to fit within two adjacent bearing members 12, and to both interact with opposing proximal knives 60 to create one grating section 4 having an overhanging cross member 19 of a desired overhang length on one grating section 4, and a flush cross member 18 on an adjacent grating section 4.

The knives 56 of the present invention are illustrated as cylindrical knives having an outer diameter surface that is flat, and thus having a sharp edge on both sides of the outer diameter surface. However, it should be understood that the knives may have any type of shape, such as an outer diameter surface that is angled (e.g., converging or diverging), curved, non-uniform, or the like.

Figure 5:
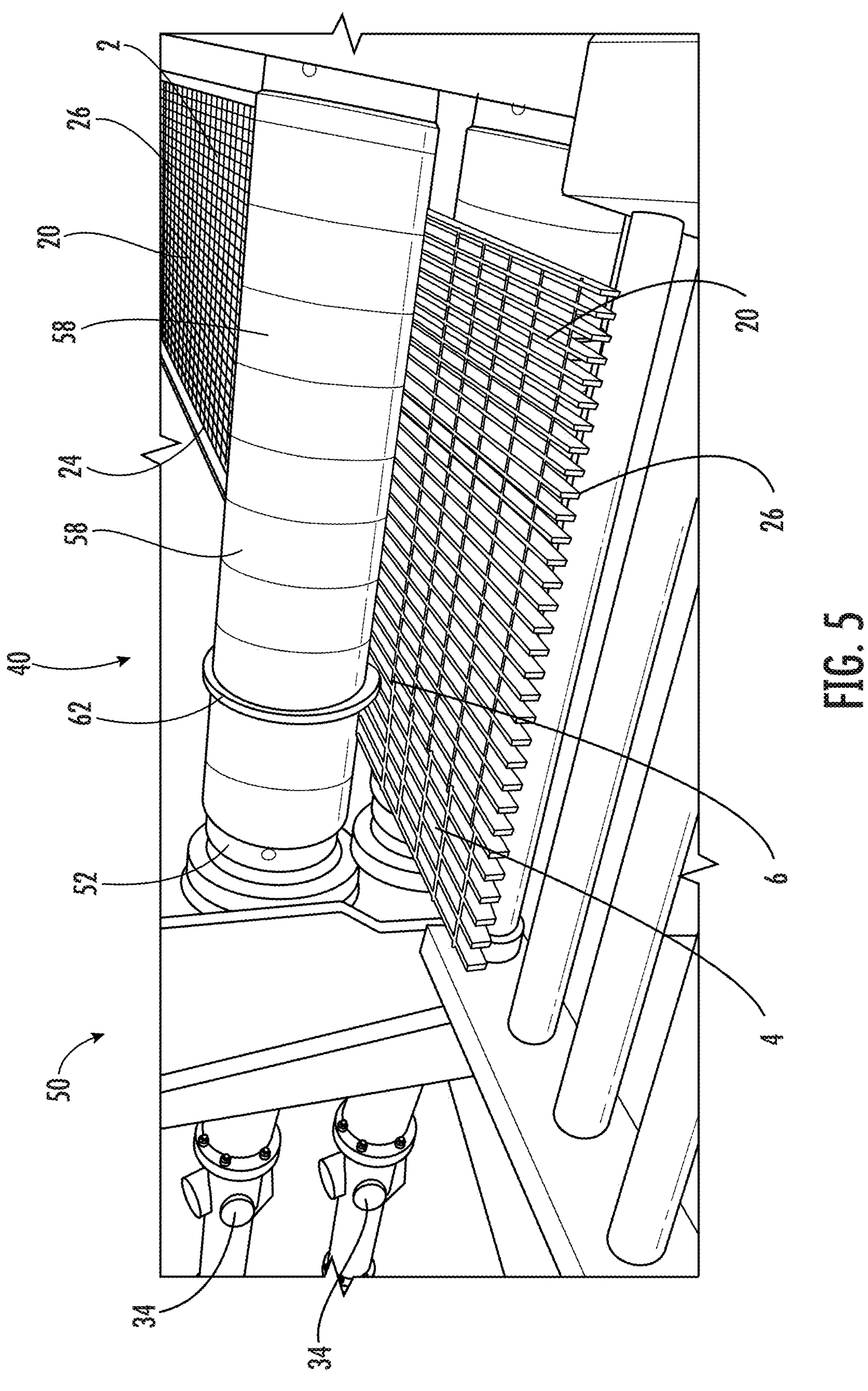
FIG. 5 illustrates a perspective view of a die assembly of a separation system beginning to separate an initial grating into smaller grating sections with overhanging cross members, in accordance with some embodiments of the present invention.
Figure 6:
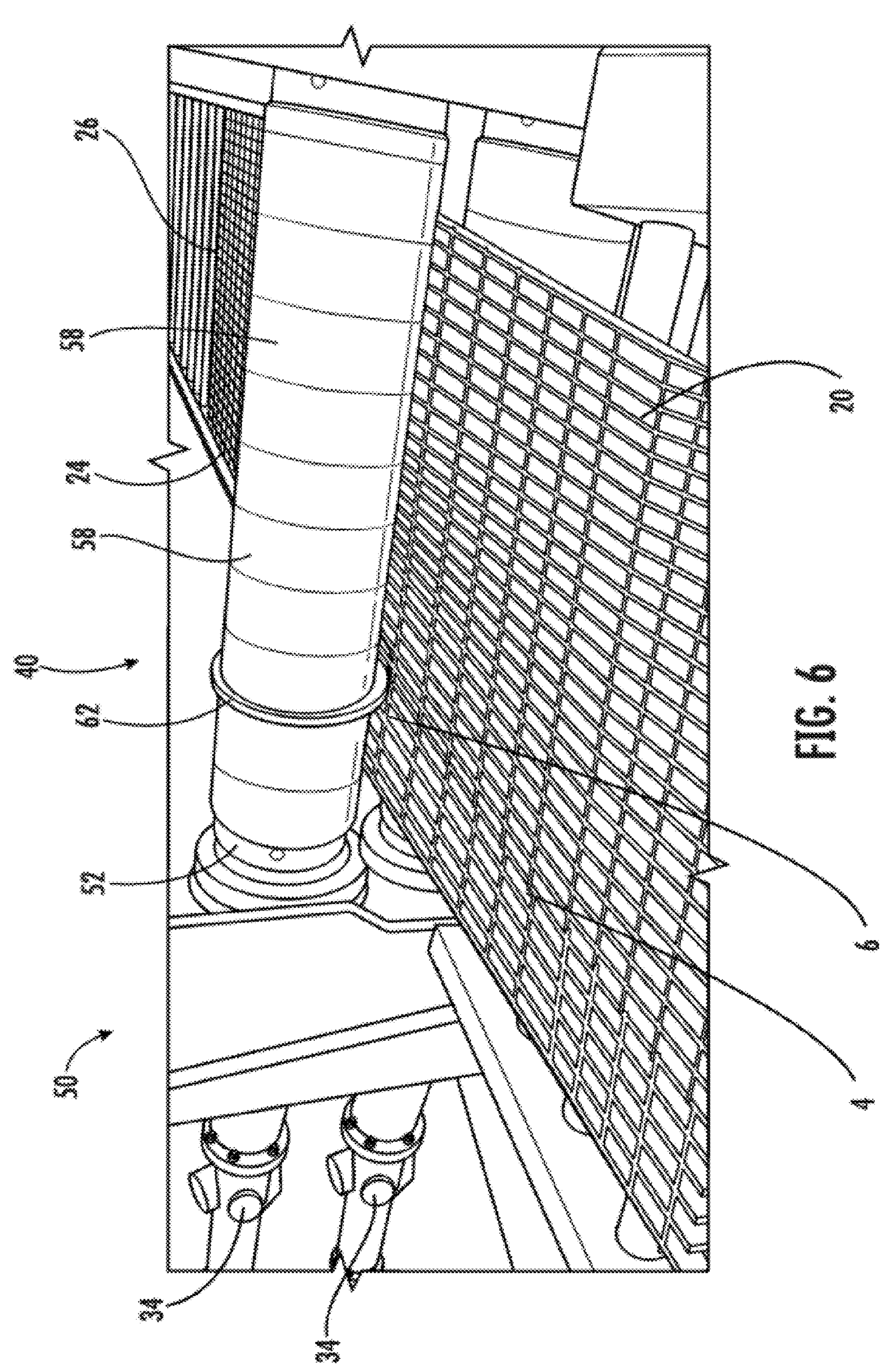
FIG. 6 illustrates a perspective view of a die assembly of a separation system in the process of separating an initial grating into smaller grating sections with overhanging cross members, in accordance with some embodiments of the present invention.
Figure 7:
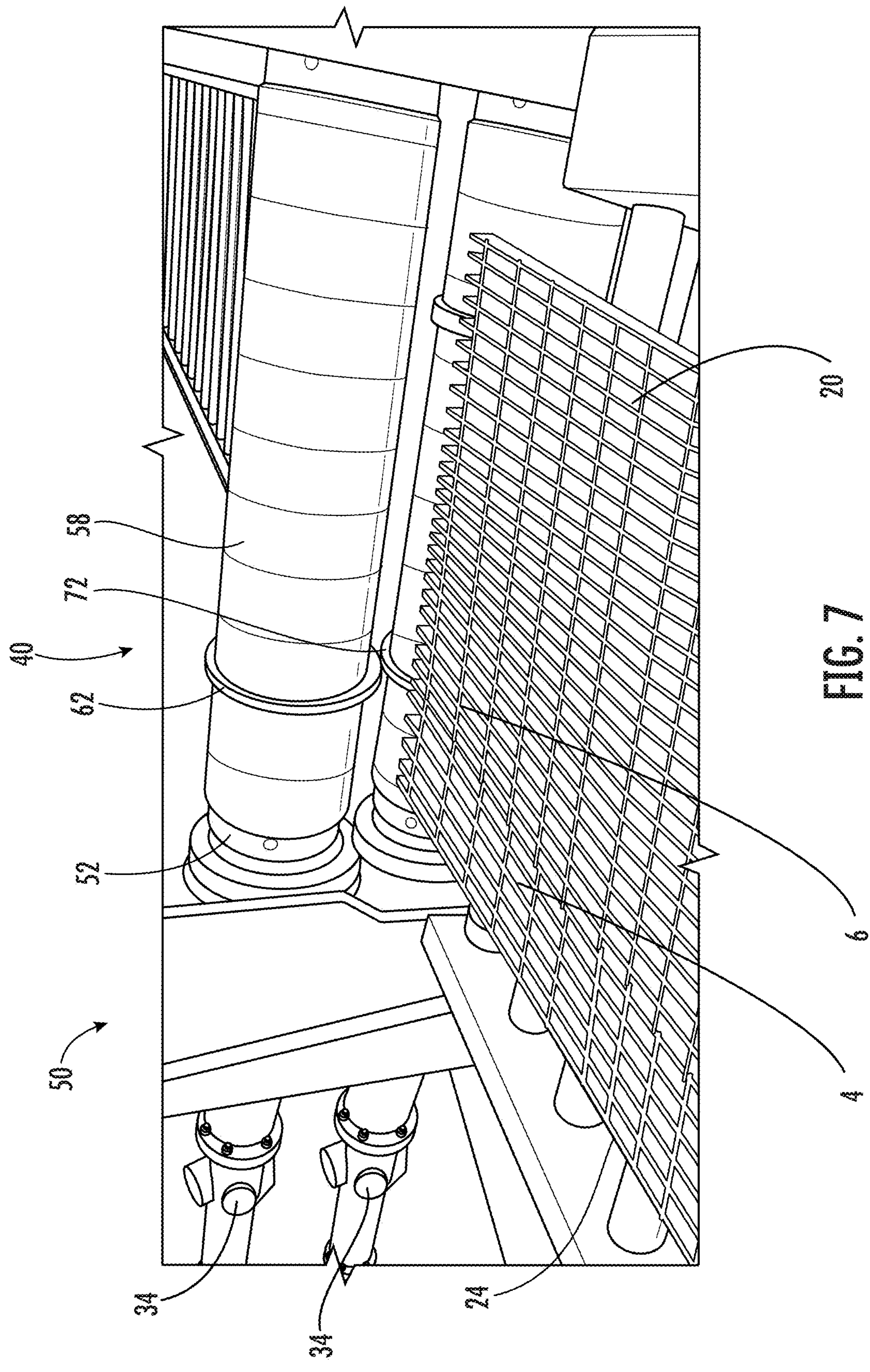
FIG. 7 illustrates a perspective view of a die assembly of a separation system after separating an initial grating into smaller grating sections with overhanging cross members, in accordance with some embodiments of the present invention.
Figure 8:
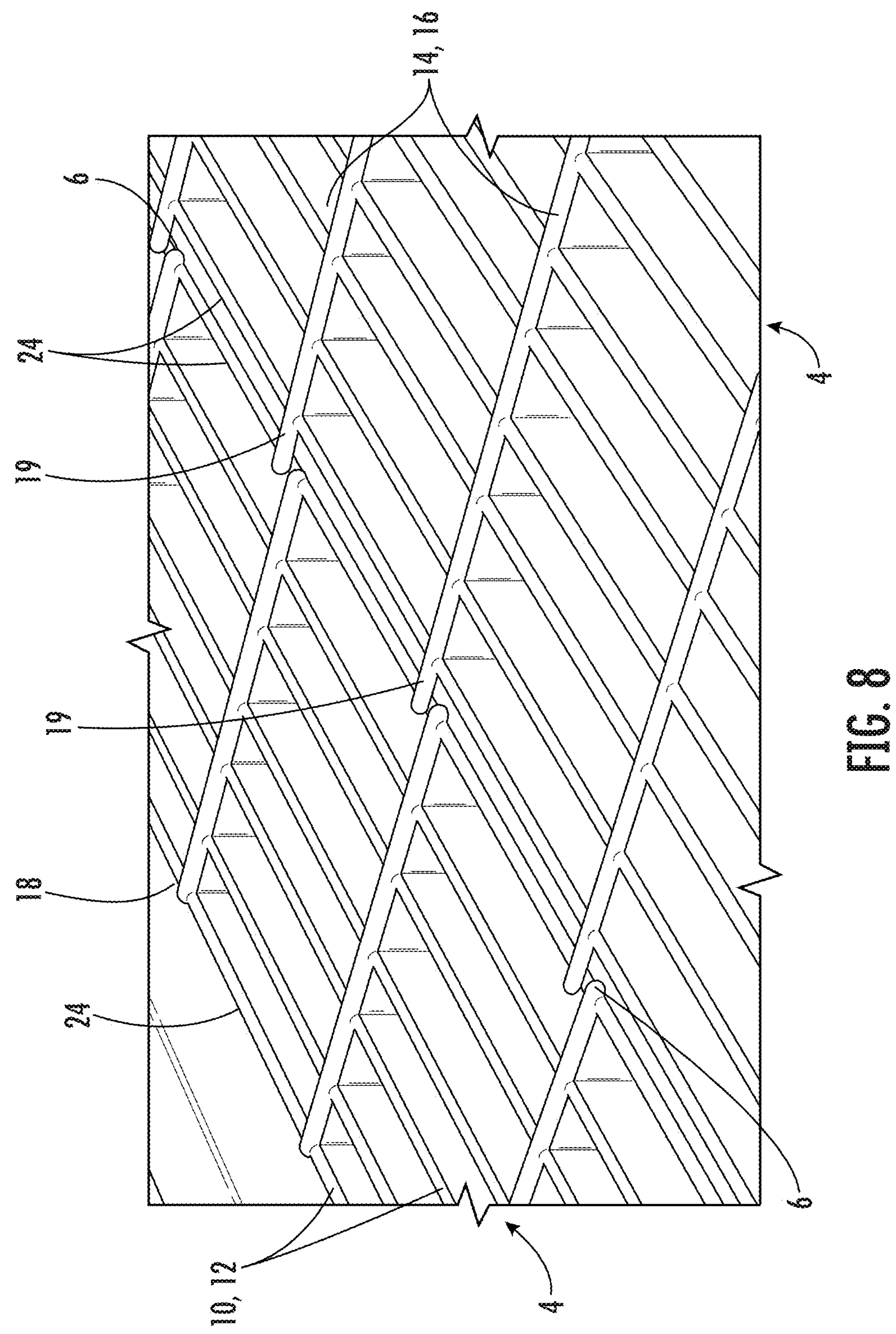
FIG. 8 illustrates an enlarged perspective view of grating after being separated and having overhanging cross members, in accordance with some embodiments of the present invention.
Figure 9:
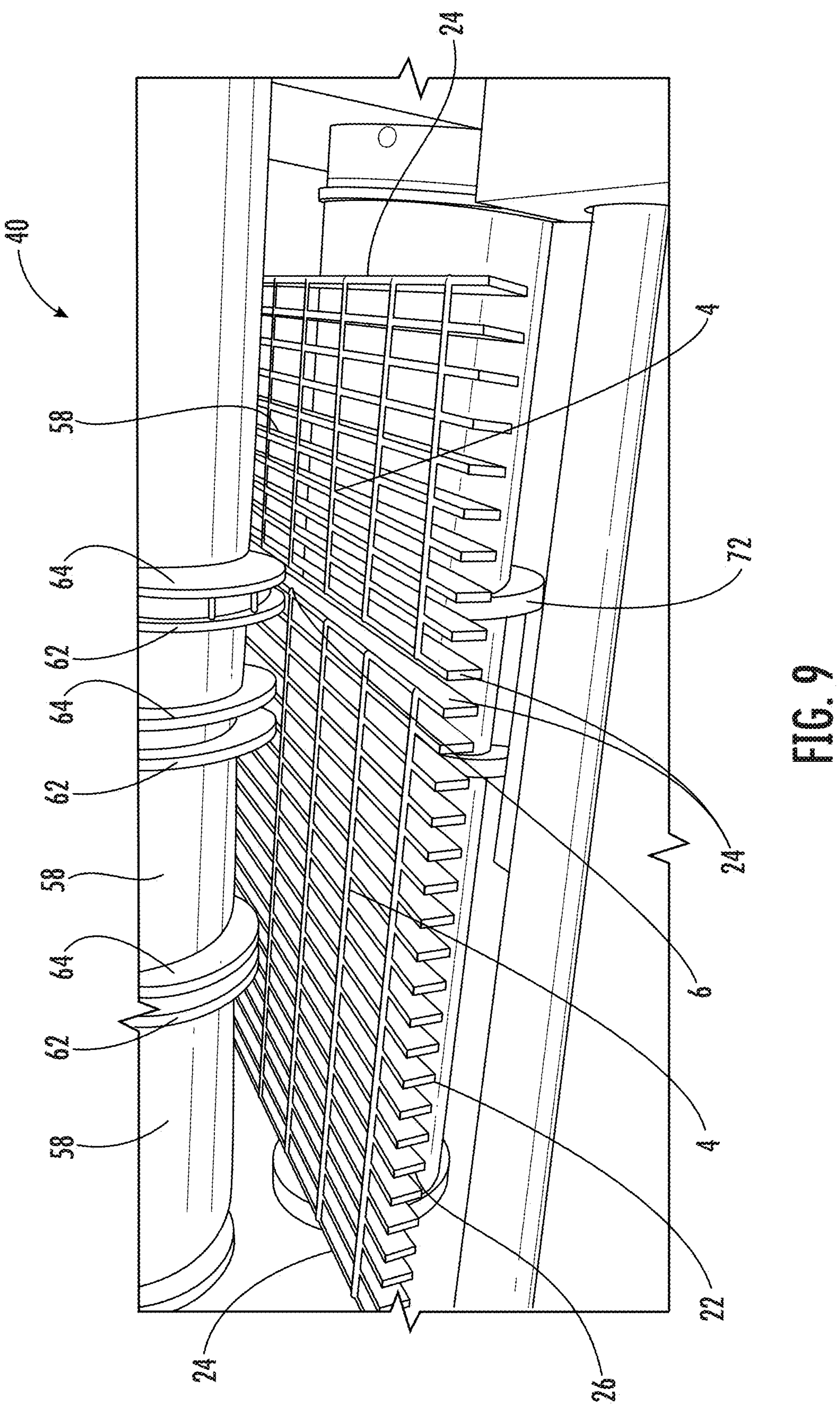
FIG. 9 illustrates a perspective view of a die assembly of a separation system beginning to separate an initial grating into smaller grating sections with flush cross members, in accordance with some embodiments of the present invention.
Figure 10:
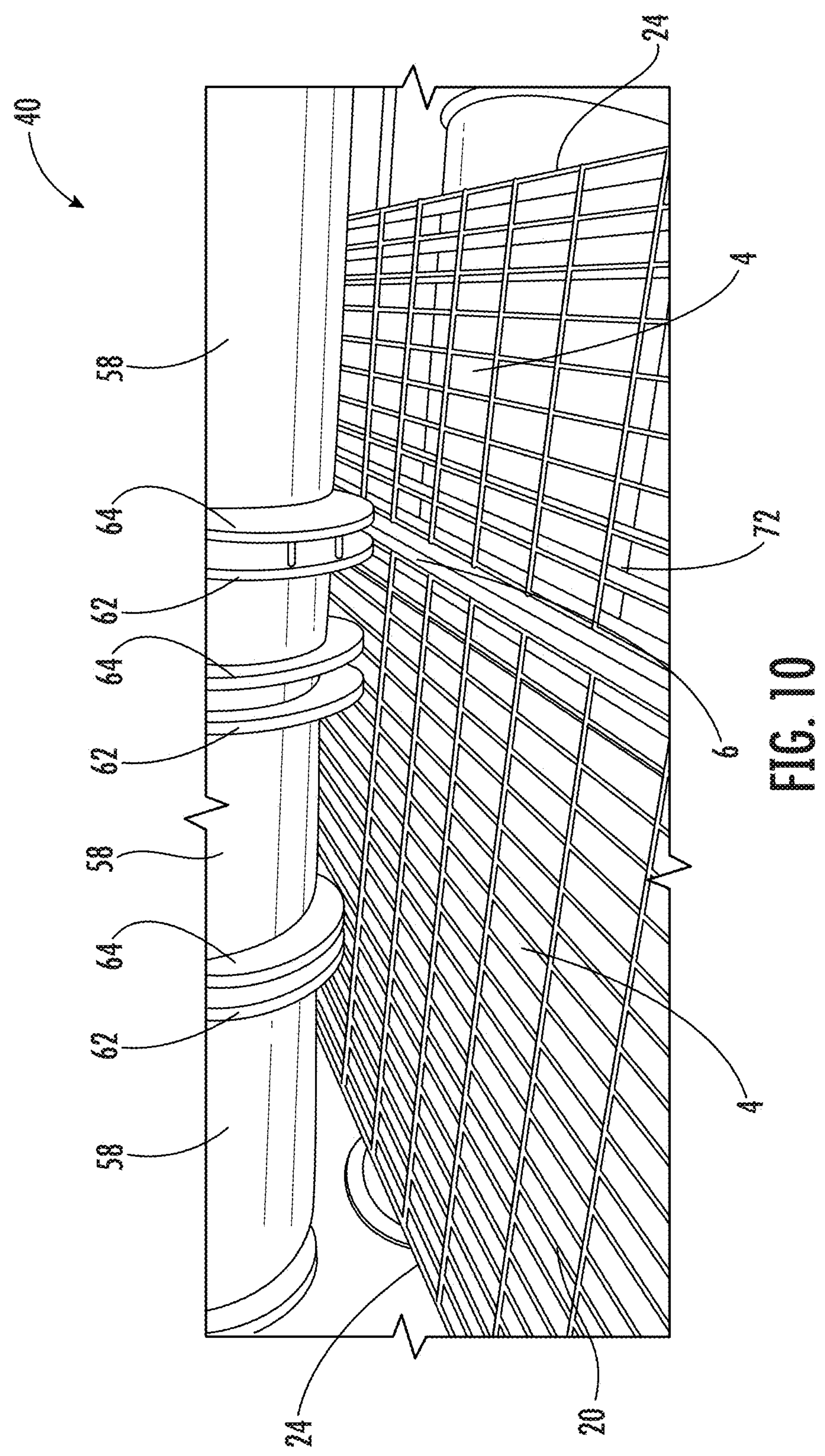
FIG. 10 illustrates a perspective view of a die assembly of a separation system in the process of separating the initial grating into smaller grating sections with flush cross members, in accordance with some embodiments of the present invention.
Figure 11:
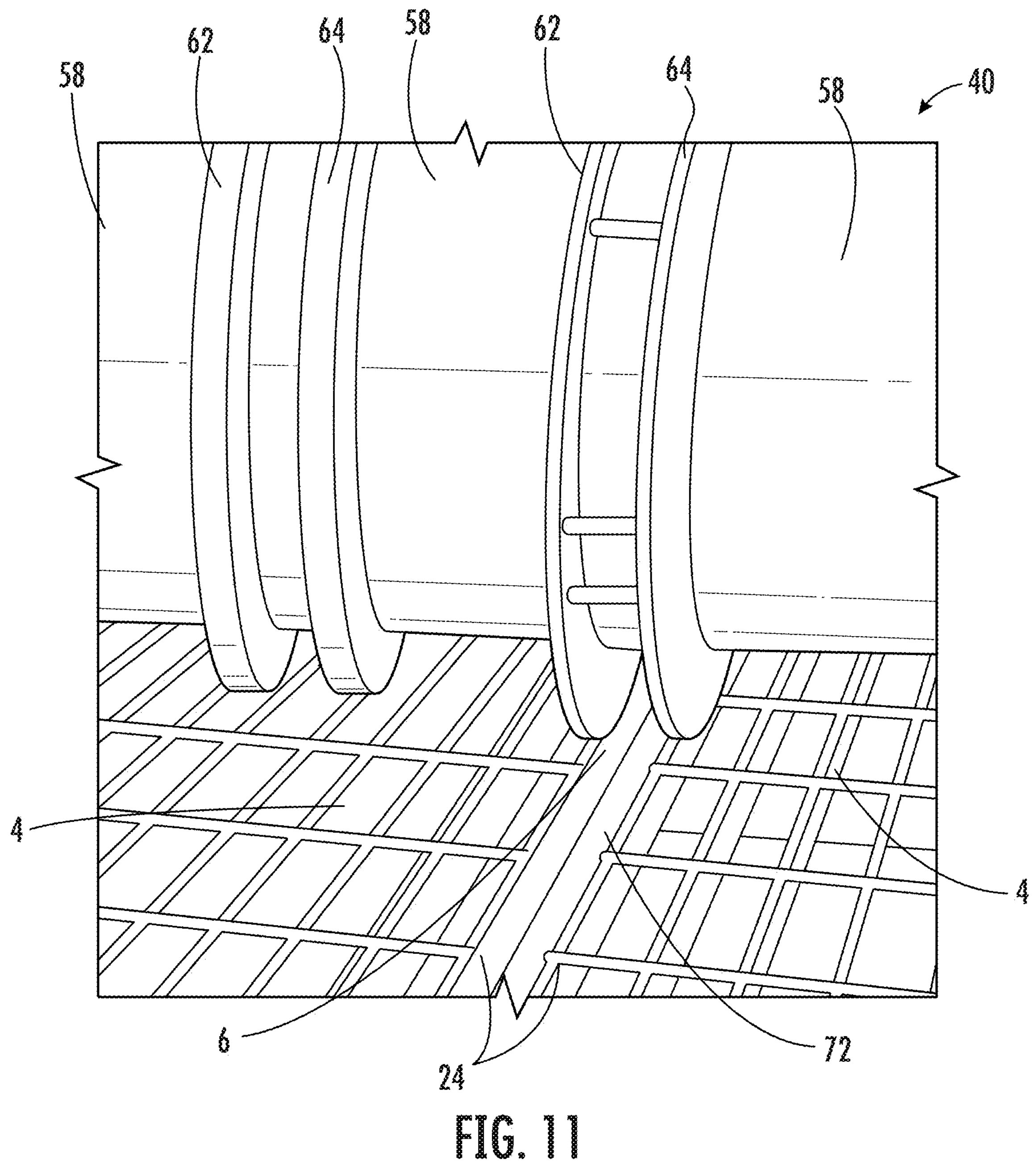
FIG. 11 illustrates an enlarged perspective view of a die assembly separating an initial grating into smaller gratings with flush cross members, in accordance with some embodiments of the present invention.
Figure 12:
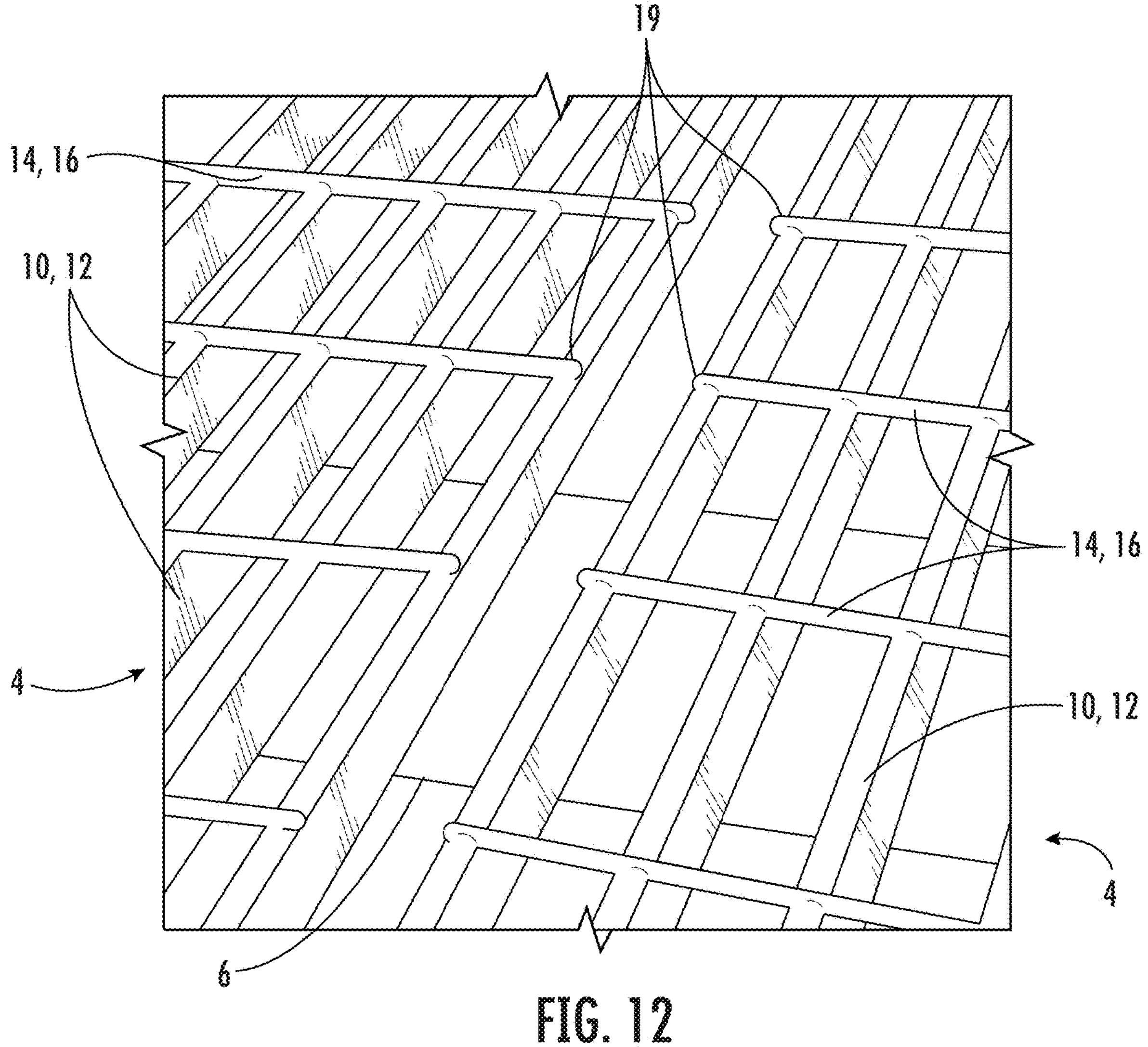
FIG. 12 illustrates an enlarged perspective view of grating after being separated and having flush cross members, in accordance with some embodiments of the present invention.

It should be understood, as illustrated in the figures, that multiple proximal knives 60 and multiple distal knives 70 may be utilized in order to form any number of gratings having the same or different widths, and having flush cross members 18 and/or overhanging cross members 19 (having the desired overhanging length) based on the need of customers. For example, FIGS. 5 through 7 illustrate that a single proximal knife 60 and a single distal knife 70 are being used to separate an initial grating 2 into two gratings 4 having two different widths. The first grating having a smaller width than the second grating, and the second grating having overhanging cross members 19 with the first grating having flush cross members 18. In alternate embodiments, FIGS. 9 through 12 illustrate a configuration in which multiple proximal knives 60 are illustrated (e.g., three offset first and second proximal knife sets 62, 64), but only the third proximal knife set 62, 64 has an opposing distal knife 70. As such, in FIGS. 9-12 an initial grating 2 is being separated into two grating sections 4 having different widths and both with flush cross members 18.

In some embodiments, more than two gratings 4 may be formed from a single pass of an initial grating 2 through the die assembly 40. For example, FIG. 1 illustrates that six proximal knives 60 (e.g., three offset first and second proximal knife sets 62, 64) and six distal knives 70 (e.g., illustrated as three stacked first and second distal knives 72, 74, but could be three single distal knives 70). In the illustrated embodiment in FIG. 1, the initial grating 2 is being separated into four gratings each having flush cross members 18. Three of the gratings have the same width and one of the gratings has a smaller width. It should be understood that any combination of proximal and distal knives 60, 70 may be used to create any number of gratings with flush or overhanging members 18, 19, which is only limited by the size of the separating system 30 (or die set assembly 40 size) and/or the width of the initial grating 2.

Moreover, while the separation system 30 is illustrated as receiving a single initial grating 2, it should be understood that two separate initial gratings 2 may be inserted into the separation system 30 at the same time (e.g., side by side) in order to allow for alternate configurations to quickly separate gratings 1 to the desired sizes while reducing or eliminating waste. In some embodiments, the initial gratings 2 may be inserted into the separation system 30 in series in order to create a plurality of grating sections 4 quickly and efficiently from multiple initial gratings 4. It should be further understood that in order to adjust the number of gratings being formed, only one of multiple proximal knives 60 of the proximal die 52 or one of multiple distal knives 70 of the distal die 54 may be removed because both proximal knives 60 and distal knives 70 may be required to separate the cross members 16. Alternatively, in order to adjust the number of gratings being formed, the initial grating 2 being inserted into die assembly 40 may be inserted at different locations within the die assembly 40 such that the initial grating 2 may engage some of the knives 56 of the die assembly 40 while avoiding other knives 56 of the die assembly 40. For example, the initial grating 2 may have a width that is less than the width of the die assembly 40, and as such may be inserted into the die assembly 40 flush with one end of the die assembly 40, flush with the other end of the die assembly 40, or at any position between the ends of the die assembly 40. Consequently, depending on the location of the knives 56, this positioning of the initial grating would change the location at which the initial grating is separated.

Figure 13:
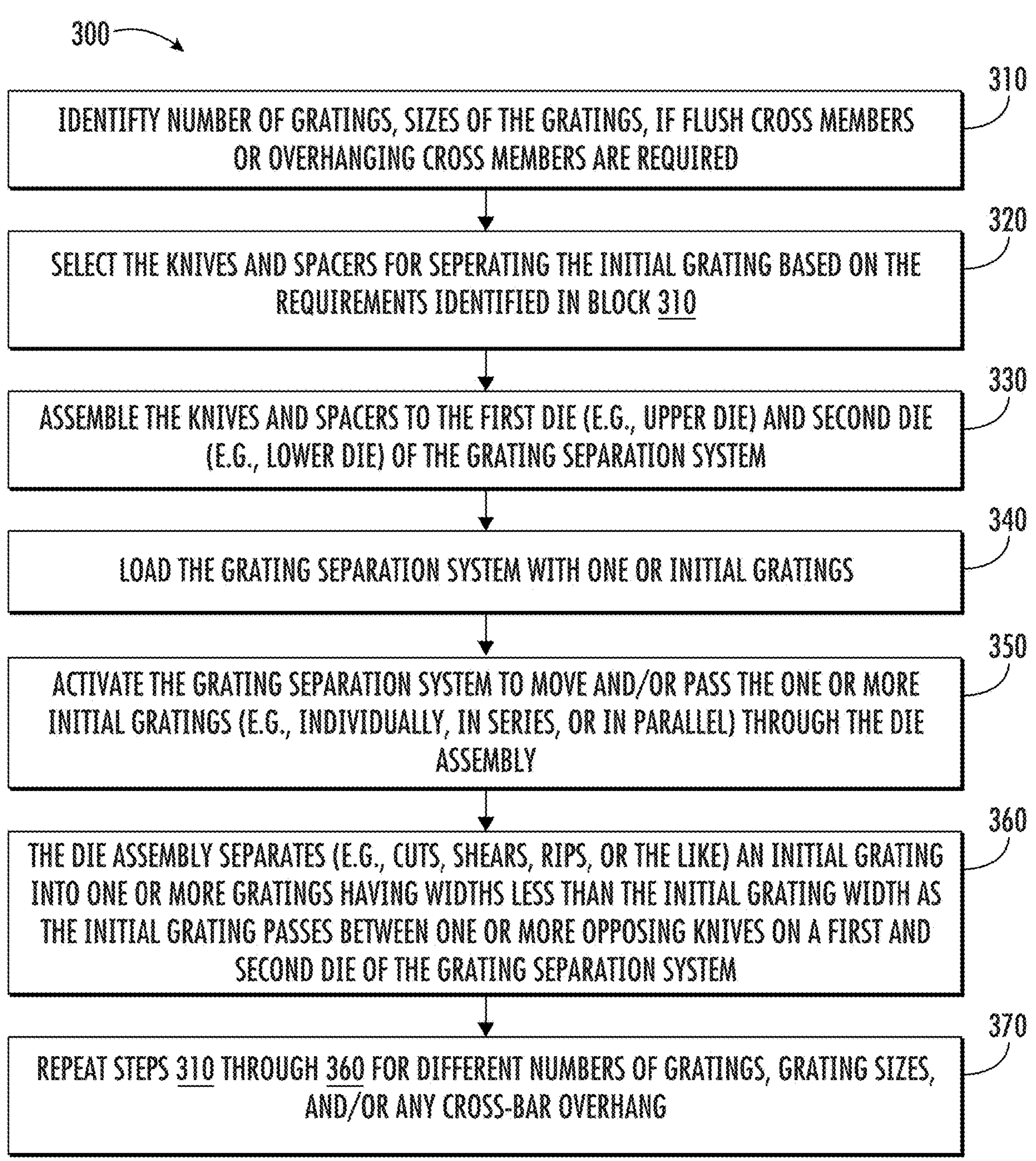
FIG. 13 illustrates a method of separating gratings, in accordance with some embodiments of the present disclosure.

FIG. 13 illustrates a process of separating a grating into multiple gratings. As illustrated by block 310, the number of gratings, sizes of gratings (e.g., width), the number of grating edges having flush cross members 18, and/or the number of grating edges having overhanging cross members 19 are identified based on an initial grating 2 being used (e.g., initial grating width).

Block 320 further illustrates that the knives 56 and spacers 58 are selected in order to meet the requirements determined in block 310. For example, the one or more proximal knives 60, the stacking and/or placement of the knives 60 with respect to the one or more distal knives 70, the stacking and/or the placement thereof, and the number of spacers 58 and widths thereof are determined.

FIG. 13 further illustrates in block 330, that the knives 56 and spacers 58 are assembled to the proximal die 52 (e.g., upper die) and the distal die 54 (e.g., lower die) of the grating separator system 30. For example, the one or more proximal knives 60 and spacers 58 are assembled to the proximal die 52 by sliding the proximal knives and/or spacers 58 over at least one of the ends of the proximal die 52. For example, the proximal knives 60 and/or the spacers 58 may have one or more keys and/or grooves, while the proximal die 52 may also have one or more keys and/or groves to order to aid in securing the proximal knives 60 and/or the spacers 58 to the proximal die 52. Furthermore, the one or more distal knives 70 and/or the spacers 58 may be assembled to the distal die 54 in the same or similar way.

Block 340 illustrates that the grating separator system 30 is loaded with one or more initial gratings 2. In some embodiments, an initial grating 2 is loaded one at a time. However, in some embodiments the initial gratings 2 may be loaded in parallel, such as if multiple initial gratings 2 are going to be separated into multiple one or more grating sections 4 at the same time. In other embodiments, multiple initial gratings 2 may be loaded in series if multiple initial gratings 2 are going to be split in the same way into the same sets of grating sections 4.

FIG. 13 further illustrates in block 350 that the separation system 30 is activated, and the gratings 1 are moved to and/or through the die assembly 40. In some embodiments the initial gratings 2 can be manually positioned in the die assembly 40, such that the when the separation system 30 is activated the rotation of one or more of the dies 52, 54 in the die assembly 40 feed the initial grating 2 through the opposing dies 52, 54. In other embodiments, the transport system 38 (e.g., driven rollers, conveyor, or the like) of the separator system 30 may move, or aid in moving, the initial grating 2 towards and/or through the die assembly 40.

Block 360 of FIG. 13 illustrates that the die assembly 40 separates (e.g., cuts, shears, rips, slices, or the like) the initial grating 2 into one or more gratings sections 4 having a smaller grating width that the initial grating width. That is, the opposing one or more proximal knives 60 and the one or more distal knives 70 separate the cross members 16 in order to form the one or more grating sections 4, as previously described herein.

It should be understood that in some embodiments the one or more proximal knives 60 and the or more distal knives 70 may flipped within the separation system 30 and/or set up such that the upper surface 20 (as illustrated in the figures) actually faces downward in the separation system 30. Consequently, the separation system 30 may be set up to separate the grating in different orientations (e.g., with the upper surface 20 facing up as illustrated in the Figures, with the upper surface 20 facing down, or the like).

The present invention provides improved efficiency, customization, repeatability, accuracy, or the like when compared with traditional manual separation of the initial gratings 2. In traditional processes, gratings may be separated by hand using manual or power tools. However, this manual process requires a lot of time as each member of the gratings have to be manually separated. In particular, when flush members are needed, two manual cuts need to be made on both sides of the gratings. The separation system 30 and process 300 of the present disclosure can separate gratings much faster, such as forming multiple gratings within seconds, such as 10, 20, 30, 40 seconds, as opposed to creating individual gratings within minutes, such as 10, 20, 30, or the like minutes. Moreover, the gratings formed from the present disclosure can be customized with less waste (e.g., multiple gratings can be easily formed at the same time with the desired widths), as opposed to the manual process which requires individual splitting of gratings that can create waste. Furthermore, the gratings formed from the present disclosure allows for repeatable and accurate processes that include grating cuts that have the same look for the flush cross members and overhanging cross members, as opposed to the manual process which results in variability with respect to the cuts that are made in the gratings.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

Certain terminology is used herein for convenience only and is not to be taken as a limiting, unless such terminology is specifically described herein for specific embodiments. For example, words such as "top", "bottom", "upper", "lower", "first", "second", or the like may merely describe the configurations shown in the figures and described herein for some embodiments of the invention. Indeed, the components may be oriented in any direction and the terminology, therefore, should be understood as encompassing such variations unless specified otherwise. The terminology includes the words specifically mentioned above, derivatives thereof and words of similar import.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method of separating grating, the method comprising:

passing an initial grating through a proximal die with two or more proximal knives and a distal die with one or more distal knives, wherein the initial grating has an initial grating width; and forming two or more gratings from the initial grating by the two or more proximal knives and the one or more distal knives, wherein the two or more gratings have grating widths that are less than the initial grating width;

wherein the initial grating and the two or more gratings each comprise a plurality of bearing members and a plurality of cross members that extend across the plurality of bearing members;

wherein the initial grating is separated into the two or more gratings by the two or more proximal knives of the proximal die and the one or more distal knives of the distal die; and wherein at least two gratings of the two or more gratings have flush cross members at adjacent edges where cross members are removed by a first proximal knife adjacent to a second proximal knife on the proximal die, and at least one distal die aligned between and opposed to the first proximal knife and the second proximal knife that fits within adjacent bearing members.

2. The method of claim 1, further comprising:

identifying a number of gratings, one or more widths of the gratings, overhanging cross members, or flush cross members; and selecting the two or more proximal knives and the one or more distal knives to form the one or more gratings having the one or more widths, the overhanging cross members, or the flush cross members.

3. The method of claim 1, further comprising:

assembling the two or more proximal knives to the proximal die;

assembling the one or more distal knives to the distal die; and assembling one or more spacers to the proximal die and one or more spacers to the distal die.

4. The method of claim 1, wherein when forming a grating of the two or more gratings having overhanging cross members, the two or more proximal knives further comprise a third proximal knife on the proximal die, and the one or more distal knives further comprise another distal knife on the distal die adjacent to and opposing the first proximal knife.

5. The method of claim 1, wherein when forming a grating of the two or more gratings having overhanging cross members, the two or more proximal knives further comprise a third proximal knife on the proximal die, and the one or more distal knives further comprise another distal knife on the distal die adjacent to and opposing the third proximal knife, and an offset spacer, and wherein a distal knife width and an offset spacer width fit within other adjacent bearing members.

6. The method of claim 1, wherein the proximal die interacts with an upper surface of the initial grating and the one or more gratings.

7. The method of claim 1, wherein the distal die interacts with a lower surface of the initial grating and the one or more gratings.

8. The method of claim 1, wherein the one or more distal knives have a distal knife width to extend between the adjacent bearing members of the plurality of bearing members where adjacent cross members are separated.

9. The method of claim 1, wherein one of the one or more distal knives are used without the one or more proximal knives to serve as a guide to aid in passing the initial grating between the proximal die and the distal die without separating the initial grating where the guide is located.

10. A die assembly for separating an initial grating into two or more gratings, the die assembly comprising:

a proximal die having two or more proximal knives comprising of at least a first proximal knife adjacent to a second proximal knife on the proximal die; and a distal die having one or more distal knives comprising of at least one distal knife aligned between and opposed to the first proximal knife and the second proximal knife;

wherein the one or more distal knives are located adjacent and opposite of the two or more proximal knives and are configured to separate the initial grating into the two or more gratings;

wherein the initial grating and the two or more gratings each comprise a plurality of bearing members and a plurality of cross members that extend across the plurality of bearing members, and wherein the two or more gratings have one or more grating widths that are less than an initial grating width of the initial grating;

wherein at least two gratings of the two or more gratings have flush cross members at adjacent edges where cross members are removed by the first proximal knife adjacent to the second proximal knife on the proximal die, and the at least one distal die aligned between and opposed to the first proximal knife and the second proximal knife that fits within adjacent bearing members.

11. The die assembly of claim 10, wherein when forming a grating of the two or more gratings having overhanging cross members, the two or more proximal knives further comprise a third proximal knife on the proximal die, and the one or more distal knives further comprise another distal knife on the distal die adjacent to and opposing the third proximal knife.

12. The die assembly of claim 10, wherein when forming a grating of the two or more gratings having overhanging cross members, the two or more proximal knives further comprise a third proximal knife on the proximal die, and the one or more distal knives further comprise another distal knife on the distal die adjacent to and opposing the third proximal knife, and an offset spacer, and wherein a distal knife width and an offset spacer width fit within other adjacent bearing members.

13. The die assembly of claim 10, wherein the proximal die interacts with an upper surface of the initial grating and the one or more gratings; and wherein the distal die interacts with a lower surface of the initial grating and the one or more gratings.

14. The die assembly of claim 10, wherein the one or more distal knives have a distal knife width to extend between two adjacent bearing members of the plurality of bearing members where the cross members are separated.

15. The die assembly of claim 10, wherein one of the one or more distal knives are used without one or more proximal knives to serve as a guide to aid in passing the initial grating between the proximal die and the distal die without separating the initial grating where the guide is located.

16. A grating separating machine, comprising:

a drive;

one or more drive shafts operatively coupled to the drive; and a die assembly operatively coupled to the one or more drive shafts, the die assembly comprising:

a proximal die having two or more proximal knives comprising of at least a first proximal knife adjacent to a second proximal knife on the proximal die; and a distal die having one or more distal knives comprising of at least one distal knife aligned between and opposed to the first proximal knife and the second proximal knife;

wherein the one or more distal knives are located adjacent and opposite of the two or more proximal knives and are configured to separate an initial grating into two or more gratings;

wherein the initial grating and the two or more gratings each comprise a plurality of bearing members and a plurality of cross members that extend across the plurality of bearing members, and wherein the two or more gratings have one or more grating widths that are less than an initial grating width of the initial grating;

wherein at least two gratings of the two or more gratings have flush cross members at adjacent edges where cross members are removed by the first proximal knife adjacent to the second proximal knife on the proximal die, and the at least one distal die aligned between and opposed to the first proximal knife and the second proximal knife that fits within adjacent bearing members.

17. The die assembly of claim 16, wherein when forming a grating having overhanging cross members:

the two or more proximal knives further comprise a third proximal knife on the proximal die, and the one or more distal knives further comprise another distal knife on the distal die adjacent to and opposing the third proximal knife; or the two or more proximal knives further comprise the third proximal knife on the proximal die, and the one or more distal knives further comprise the other distal knife on the distal die adjacent to and opposing the third proximal knife, and an offset spacer, and wherein a distal knife width and an offset spacer width fit within other adjacent bearing members.

* * * * *